US006632326B1

(12) United States Patent
Hirano et al.

(10) Patent No.: US 6,632,326 B1
(45) Date of Patent: Oct. 14, 2003

(54) MODIFYING METHOD FOR WOOD ELEMENTS

(75) Inventors: Yoshihiro Hirano, Hamamatsu (JP); Ritsuo Iwata, Hamamatsu (JP); Hiroshige Murakami, Hamamatsu (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 09/670,746

(22) Filed: Sep. 27, 2000

(30) Foreign Application Priority Data

Sep. 30, 1999 (JP) .......................... 11-280680

(51) Int. Cl.$^7$ .............. B27K 3/36; B05D 1/18
(52) U.S. Cl. .............. 162/9; 162/25; 162/27; 156/62.4; 264/109
(58) Field of Search .......... 144/342; 241/28; 162/27, 9, 13, 25, 225; 8/121; 156/62.4; 264/109

(56) References Cited

U.S. PATENT DOCUMENTS 3,720,661 A * 3/1973 Breton et al. ............ 536/69
4,056,342 A * 11/1977 Fremont et al. .......... 425/223
4,227,965 A * 10/1980 Luszczak ................. 162/13
4,592,962 A * 6/1986 Aoki et al. ............... 427/325
4,804,384 A * 2/1989 Rowell et al. ............ 427/212
5,431,868 A * 7/1995 Hirano .................... 264/83
5,525,721 A   6/1996 Ohshima et al. .......... 536/69
5,624,616 A * 4/1997 Brooks ................... 162/10

FOREIGN PATENT DOCUMENTS

DE    69411887 T2    4/1999
JP      7-9418       1/1995

* cited by examiner

*Primary Examiner*—Sam Chuan Yao
(74) *Attorney, Agent, or Firm*—Dickstein, Shapiro, Morin & Oshinsky, LLP.

(57) ABSTRACT

The present invention's modifying method for wood elements includes a step for soaking wood elements in one or a mixture of acetic anhydride, acetic acid, or chloroacetic acid; and a step for acetylating the impregnated wood elements in a gaseous phase. This method makes it possible to reduce the time required for the step of acetylating the wood elements, simplifies the process, reduces fabrication costs, and enables fabrication of a wood fiberboard having high dimensional stability.

14 Claims, No Drawings

MODIFYING METHOD FOR WOOD ELEMENTS

BACKGROUND OF THE INVENTION

1. Field of the Invention

The present invention relates to a modifying method for wood elements that are obtained from cutting up a wood material.

This application is based on a patent application filed in Japan (Japanese Patent Application No. Hei 11-280680), the contents of which are incorporated herein by reference.

2. Description of the Related Art

The method disclosed in Japanese Patent Application First Publication No. Hei 7-9418 may be cited as an example of a conventional method for modifying wood elements. Briefly stated, this method describes drying wood elements, such as wood chips or wood particles, until the water content thereof is 3% or less, and preferably 1% or less by weight relative to the total weight of the wood elements. Next, these dried wood elements are brought into contact with an acetylating agent in the vapor phase, such as a gaseous steam of acetic anhydride, that was generated by heating. The acetylating reaction is then carried out to modify the wood elements.

This method offers the advantage of decreasing the water absorbency and hygroscopicity of the wood elements by acetylating them in the vapor phase, so that wood fiberboard fabricated from these wood elements has an increased dimensional stability. However, the preceding method has also been problematic in that the acetylating reaction is limited to the surface of the wood elements with a high bulk density and does not reach the core portion of the wood elements even if the reaction time is increased. For this reason, it has been difficult to fabricate wood elements that have a high degree of acetylation and are sufficiently modified, and to fabricate wood fibers or wood fiberboard made by digesting such wood elements, defibrating the fibers and then modifying them.

A method may also be considered in which these wood elements are firstly defibrated into fibers of low bulk density, and the acetylating reaction is then performed on these defibrated wood fibers. This method is advantageous in that the acetylating reaction reaches the core portion of the wood elements. However, the defibrated wood fibers result in an increased volume, so that a large reactor becomes necessary in order to acetylate these wood fibers. Moreover, the acetylating process, which requires a long period of time, must be carried out more than once. As a result, the operational efficiency is poor, considerable processing time is required for acetylating, and the costs associated with this processing are high.

SUMMARY OF THE INVENTION

It is therefore the objective of the present invention to provide a modifying method for wood elements that reduces the processing time required for acetylating wood elements that are obtained by cutting up a wood material, such as wood chips or wood particles, simplifies the acetylating process, reduces fabricating costs, and enables the provision of a wood fiberboard with a high degree of dimensional stability.

The present invention provides a modifying method for wood elements comprising:

a step for soaking wood elements obtained by cutting up a wood material in an impregnant selected from a group consisting of acetic anhydride, acetic acid, chloroacetic acid and a mixture thereof; and a step for acetylating the impregnated wood elements in a gaseous phase.

This method makes it possible for the impregnant to penetrate into the core portions of the wood elements prior to the acetylating step. As a result, the acetylating reaction progresses rapidly, making it possible to fabricate wood elements having a high degree of acetylation, and excellent resistance to moisture and humidity. Moreover, since the acetylating reaction is not limited to the surface of this small volume of wood elements, and progresses sufficiently to the core portion, it is not necessary to defibrate the wood elements into a large volume of wood fibers in order to carry out acetylation. Accordingly, the reactor employed for the acetylating step can be made smaller, and the amount of wood elements that can be processed in one acetylating process can be increased. As a result, operational efficiency is improved, the time required for the acetylating process can be shortened and the costs can be reduced.

The present invention provides a method for fabricating wood fibers comprising:

a step for acetylating wood elements obtained by cutting up a wood material; and a step for digesting acetylated wood elements, and then defibrating into fibers.

In the preferred embodiments, the acetylating step follows after a step for soaking wood elements obtained by cutting up a wood material in an impregnant selected from a group consisting of acetic anhydride, acetic acid, chloroacetic acid and a mixture thereof, and the acetylating step is carried out for the impregnated wood elements in a gaseous phase.

This method makes it possible to fabricate wood fibers from highly acetylated wood elements that were acetylated in the vapor or liquid phase. As a result, operational efficiency is improved, less time is required for acetylating, and costs are reduced as compared to the conventional method for acetylating high volume wood fibers obtained by defibrating wood elements into fibers. Moreover, it is possible to fabricate wood fibers that have excellent resistance to moisture and humidity.

In another embodiment, the present invention offers a method for fabricating a wood fiberboard comprising:

a step for acetylating wood elements obtained by cutting up a wood material;

a step for digesting acetylated wood elements, and then defibrating said digested acetylated wood elements into fibers; and a step for forming said wood fibers into a board using a binder resin, and rendering into a wood fiberboard.

In the preferred embodiments, the acetylating step follows after a step for soaking wood elements obtained by cutting up a wood material in an impregnant selected from a group consisting of acetic anhydride, acetic acid, chloroacetic acid and a mixture thereof, and the acetylating step is carried out for the impregnated wood elements in a gaseous phase.

This method makes it possible to fabricate wood fiberboards having excellent resistance to moisture and humidity, and superior dimensional stability.

DESCRIPTION OF THE PREFERRED EMBODIMENTS

Wood material in a variety of forms that is obtained from cutting up wood may be employed as the wood elements used in this invention. For example, wood chips or wood particles can be used as the wood elements. Wood chips as employed here are wood pieces that are roughly 5~50 mm in width, 30~100 mm long, and 2~20 mm thick. Wood particles as employed here are wood pieces that are roughly 1~5 mm in width, 5~30 mm long, and 0.5~2 mm thick.

The wood material to be cut up is not particularly restricted, however, preferred sources for the starting material include aspen, radiata pine, lodge-pole pine, Japanese cedar, Japanese cypress, larch, white fir, spruce and the like.

In the present invention, the above-described wood elements are soaked in a treatment solution that is one or a mixture of acetic anhydride, acetic acid, and chloroacetic acid, and then acetylated. However, prior to these operations, the wood elements are dried until they reduced a moisture content of 3% or less, and preferably 1% or less by weight relative to the total weight of the wood elements. If the moisture content of the wood elements is high during the soaking treatment, the impregnant reacts with the water component in the wood elements, resulting in a wasteful consumption of the impregnant. As a result, the efficiency of the soaking treatment and of the acetylating process decreases and is not economical.

Next, the thus-dried wood elements are soaked in the impregnant. The impregnant is one or a mixture of acetic anhydride, acetic acid, and chloroacetic acid. Acetic anhydride is preferred however. With regard to the soaking treatment, it is preferable to bring the wood elements and the impregnant into contact with one another under reduced pressure conditions. By performing this type of soaking treatment to the wood elements, the impregnant penetrates into the core portions of the wood elements, promoting the acetylating reaction in the vapor phase in the subsequent step. For this reason, it is possible to fabricate wood elements in a short period of time that are highly acetylated.

As a specific method for this soaking treatment, a method may be cited, for example, in which the bottom portion of a reduced pressure vessel is filled with acetic anhydride, dried wood elements are placed in the vessel, and the wood elements are soaked in the acetic anhydride under reduced pressure conditions. The impregnating pressure is −600 mmHg or less, and preferably −700~−750 mmHg, and the impregnating time is 10 minutes or more, and preferably 10~20 minutes. The impregnating temperature is 5~50° C., and preferably 15~35° C. Note, however, that these impregnating conditions may be suitably changed according to the degree of acetylating required.

Next, the impregnated wood elements are brought into contact with the gaseous steam of an acetylating agent in vapor form, and are thereby acetylated. A portion of the hydroxyl (OH) groups in the wood element (W) are substituted with acetyl (OCOCH$_3$) groups as shown by the following equation.

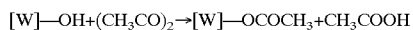
[W]—OH+(CH$_3$CO)$_2$→[W]—OCOCH$_3$+CH$_3$COOH

Acetic anhydride, acetic acid, chloroacetic acid or a mixture thereof may be employed as the acetylating agent. Of these, however, acetic anhydride is preferred. The acetylating agent may be diluted with an inert solvent that does not react with the acetylating agent, such as xylene, and employed as a mixed solution of the acetylating agent and the solvent. In this case, it is preferable to employ the aforementioned solvent in an amount that is 70 wt % or less by weight with respect to the total weight of the mixed solution obtained. By employing this type of mixed solution of an acetylating agent and a solvent in the process for acetylating the wood elements, the acetylating reaction for the wood elements, which is an exothermic reaction, proceeds in a moderate state. As a result, thermal deterioration or excessive acetylating of the wood elements is limited, and the acetylating reaction can be carried out more easily.

The degree of acetylation of the wood elements from the acetylating treatment is in the range of a 10~30%, and preferably a 12~22%, rate of weight increase in the wood elements. However, this range may be suitably adjusted according to the resistance of moisture and humidity that is required for the wood elements.

As a specific method for acetylating the wood elements in the vapor phase, a method may be cited in which the bottom portion of a reactor is filled with acetic anhydride or the like, to serve as a supply source for the acetylating agent. Next, a supporting member consisting of a net made of stainless wire or the like is stretched over this, and the wood elements are placed onto the net. Next, the wood elements and the gaseous steam that is generated by heating the acetic anhydride come into contact in the vapor phase, with the acetylating reaction carried out as a result. The acetylating reaction is preferably carried for 15 minutes~3 hours, however, the duration may be suitably adjusted according to the degree of acetylation required of the wood elements. The temperature of the gaseous steam of the acetylating agent that is supplied to the acetylating reaction is preferably in the range of 120~160° C., and the reaction pressure is room pressure.

The thus-obtained acetylated wood elements are dried for 60 minutes with warm air at 140° C., to remove the acetic acid odor. Next, these wood elements are digested for 2~5 minutes under high-pressure steam at a temperature of around 150~170° C., and the wood fibers are obtained by separation of the wood elements into fibers through a disk refiner. The shape of the wood fibers obtained is not particularly restricted. For example, the fibers may be 0.1~1.0 mm thick, and 0.2~50 mm long.

Next, the thus-obtained acetylated wood fibers are coated with a binder resin. Examples of the binder resin employed here include foaming resins such as foam urethane, foam phenol, and foam melamine resin, non-foaming resins such as melamine, melamine urea, urea, and phenol resin, or a mixture of these. MDI (polymethylene diphenyl diisocyanate), which has excellent adhesion, is preferred, however.

The amount of the aforementioned binder resin employed is not particularly restricted, and may be, for example, 5~25 wt % of the solid component with respect to the wood fibers. If the amount of binder resin is less than 5 wt % of the solid component with respect to the wood fibers, then the adhesion of the wood fibers is not sufficient. On the other hand, if the amount of binder resin exceeds 25 wt % of the solid component with respect to the wood fibers, then the binder is being used in an excessive amount, which is not economical.

The method for coating the binder resin over the wood fibers is not particularly restricted. A spray method is preferred, however. For example, a method suitably employed is one in which the acetylated wood fibers are placed in a revolving drum that revolves at low speed. As the wood fibers drop naturally within the revolving drum, the binder resin is spray-coated over the wood fibers.

In addition, curing agents, curing catalysts, curing accelerators, diluents, thickeners, adhesive compounds, dispersing agents, and water repelling agents may be added to the binder resin as needed.

Next, the wood fibers that have been coated with the binder resin amodified into a mat by a conventional forming method, and then amodified and laminated into a board by heating and pressurizing this mat. A wood fiberboard is obtained as a result. The heating temperature when forming the wood fiberboard is suitably set according to the binder resin employed. While not particularly restricted, this temperature is in the range of 150~220° C., and preferably 180~200° C., when employing MDI. The pressure when forming the wood fiberboard is not particularly restricted, but is preferably 80~20 kgf/cm$^2$ when employing MDI. The duration of the heating and pressurizing required when forming the wood fiberboard is 5~10 minutes in the case where the thickness of the fiberboard formed is 10 mm.

Flame retardants, coloring agents, insecticides, rot proofing agents, fungicides, water repelling agents, sound absorbing material, foam beads, fillers, reinforcing material and the like may be added to the wood fibers during forming.

EMBODIMENT

An embodiment will now be presented in order to further clarify the present invention. This embodiment shows one arrangement for the present invention, and is not intended to limit the present invention thereto. Rather, this embodiment may be optionally changed, provided these changes remain within the scope of the invention.

EMBODIMENT 1

Broadleaf tree particles that were 1~5 mm wide, 5~30 mm long, 0.5~2 mm thick, and had a bulk density of 0.72 g/cm$^3$ were prepared for use as the wood elements. These were dried until they had a moisture content of 3% by weight relative to the total weight of the wood elements. Next, the dried particles were placed in a reduced pressure vessel that had been filled with acetic anhydride, and an acetic anhydride soaking treatment was carried out under reduced pressure conditions. The treatment was carried out at 25° C. with the reduced pressure vessel set to −760 mmHg. The particles and the acetic anhydride were left in contact with one another for 30 minutes, so that the acetic anhydride impregnated into the particles. The gaseous acetylating treatment device (Sumitomo Chemical Engineering Co.) was next used to bring the impregnated particles and the acetic anhydride rendered in the form of a gaseous steam together for 40 minutes at 150° C., thereby carrying out the acetylating treatment. The degree of acetylation of the particles thus obtained was 17.7% in terms of the rate of weight increase in the particles. Next, the acetylated particles were dried for 60 minutes with warm air at 140° C. to remove the acetic acid odor, after which they were digested for 5 minutes in steam at a temperature of 150° C., and the fibers were defibrated to obtain wood fibers.

The thus-obtained acetylated wood fibers were introduced into a drum that was revolving at low speed. A binder resin was spray-coated over the wood fibers as they fell naturally within the drum. For the binder resin, a resin composition was employed in which 42 g of acetone was added to 42 g of P-MDI (Sumidur 44V20, Sumitomo Bayer Co.), this resin composition having a total moisture mass of approximately 30%. 604 g of wood fibers coated with the binder resin were placed in a 330 mm square press device. A laminate with a bulk height of 80 mm was prepressed to obtain a board having a thickness of 30 mm. The obtained board was then subjected to thermal compression for 2 minutes at a temperature 180° C. and a pressure of 80~20 kgf/cm$^2$. In this way, a wood fiberboard was obtained that was 6.2 mm thick and had a bulk density of 0.83 g/cm$^3$.

Reference lines having a distance of approximately 160 mm between them were carved into the obtained wood fiberboard. Using a reading microscope accurate to 0.01 mm or higher, the interval between reference lines was measured and defined as the base length ($L_1$). The wood fiberboard was left for 72 hours at a room temperature of 35° C. and humidity of 95%. Then the moisture was wiped away, and the length ($L_2$) of the interval between reference lines was measured. The change in length due to absorption of moisture was then calculated using the following equation:

$$\text{change in length due to moisture absorption } (\%) = L_2 - L_1/L_1 \times 100$$

The result for the change in length of the wood fiberboard due to moisture absorbance was 0.12%. Given that the change in regular plywood 0.11%, the wood fiberboard exhibited dimensional stability that approached that of plywood. The measurement of the change in length due to absorption of moisture was carried out according to JIS A5905.

COMPARATIVE EXAMPLE

Particles with a moisture content of 3% by weight relative to the total weight of the particles were prepared in the same manner as in the preceding example. These particles were digested for 5 minutes in steam at a temperature of 150° C., and defibrated to obtain the wood fibers.

Next, as in the preceding example, 584 g of the obtained acetylated wood fibers were placed in a 330 mm square pressing device. A laminate with a 200 mm bulk height was prepressed to obtain a 35 mm thick board. This board was subjected to thermal compression for 2 minutes at a temperature of 180° C. and a pressure of 80~20 kgf/cm$^2$. As a result, a wood fiberboard having a thickness of 5.9 mm and a bulk density of 0.82 g/cm$^3$ was obtained.

Next, employing the same method as in the previous embodiment, the obtained wood fiberboard was left for 72 hours at a room temperature of 35° C. and a humidity of 95%. The change in length due to absorption of moisture was then calculated and found to be 0.18%. As mentioned above, the change for plywood is on the order of 0.11%. Accordingly, as compared to plywood, the obtained wood fiberboard was much inferior with respect to dimensional stability.

What is claimed:

1. A fabricating method for wood fibers comprising the steps of:

acetylating wood elements to form acetylated wood elements having a degree of acetylation being in a range of 10 to 30% based on rate of weight increase in the wood elements;

drying the acetylated wood elements with warm air to remove odor;

defibrating the acetylated wood elements after drying by digesting the acetylated wood elements after drying under high-pressure steam at a temperature of 150 to 170° C. for forming acetylated wood element fibers; and coating the acetylated wood element fibers with a binder resin whose amount is 5 to 25% by weight of a solid component with respect to wood fibers.

2. A fabricating method for wood fibers according to claim 1, wherein said acetylating step follows after a step of soaking wood elements in an impregnant selected from a group consisting of acetic anhydride, acetic acid, chloroacetic acid and a mixture thereof, and said acetylating step is carried out in a gaseous phase.

3. A fabricating method for wood fibers according to claim 2, wherein said soaking step is carried out under reduced pressure.

4. A fabricating method for wood fibers according to claim 3, wherein said soaking step is carried out under pressure of about 600 mmHg or less.

5. A fabricating method for wood fibers according to claim 4, wherein said soaking step is carried out for 10 minutes or longer under pressure of about −600 mmHg or less at a temperature of 5 to 50° C.

6. A fabricating method for wood fibers according to claim 5, wherein said soaking step is carried out for 10 to 20 minutes under pressure of about −750 to about −700 mmHg at a temperature of 15 to 35° C.

7. A fabricating method for wood fibers according to claim 3, wherein said acetylating step carried out in a gaseous phase comprises the steps of: heating an acetylating agent to generate acetylating agent gas, and contacting the acetylating agent gas and wood elements.

8. A fabricating method for wood fibers according to claim 7, wherein the acetylating agent is acetic acid.

9. A fabricating method for wood fibers according to claim 2, wherein said acetylating step carried out in a gaseous phase comprises the steps of: heating an acetylating agent to generate acetylating agent gas, and contacting acetylating agent gas and wood elements.

10. A fabricating method for wood fibers according to claim 1, wherein an acetylating agent used in said acetylating step is at least one selected from the group consisting of acetic acid, acetic anhydride and chloroacetic acid.

11. A fabricating method for wood fibers according to claim 1, wherein, in said defibrating step, wood elements are steamed in steam at a temperature of 150° to 170° C. to defibrate said wood elements.

12. A fabricating method for wood fibers according to claim 1, comprising a step of drying said wood elements to a moisture content of 3% or less before said acetylating step.

13. A fabricating method for wood fibers according to claim 1, wherein the acetylating agent is acetic acid.

14. A fabricating method for wood fibers according to claim 3, wherein the acetylated wood elements are dried with 140° C. warm air for 60 minutes or longer in the drying step.

* * * * *